United States Patent [19]

Goetz et al.

[11] 3,984,126

[45] Oct. 5, 1976

[54] INFLATOR FOR VEHICLE OCCUPANT RESTRAINT SYSTEM

[75] Inventors: George W. Goetz, Detroit; Robert G. Gehrig, Southfield, both of Mich.

[73] Assignee: Eaton Corporation, Cleveland, Ohio

[22] Filed: Apr. 10, 1974

[21] Appl. No.: 459,529

[52] U.S. Cl. ................................ 280/740; 280/731; 280/741; 102/39

[51] Int. Cl.[2] .......................................... B60R 21/08

[58] Field of Search ................ 280/150 AB; 102/39; 23/281; 222/3; 137/516.17; 9/316

[56] References Cited

UNITED STATES PATENTS

| | | | |
|---|---|---|---|
| 3,316,719 | 3/1965 | Lopretz | 102/39 |
| 3,456,682 | 7/1969 | Blackford | 137/516.17 |
| 3,532,360 | 10/1970 | Leising et al. | 280/150 AB |
| 3,608,834 | 9/1971 | MacLaren | 137/516.17 X |
| 3,773,351 | 11/1973 | Catanzarite | 102/39 X |
| 3,791,666 | 2/1974 | Shibamoto | 280/150 AB |
| 3,797,853 | 3/1974 | Grosch et al. | 280/150 AB |
| 3,827,715 | 8/1974 | Lynch | 280/150 AB |

*Primary Examiner*—Kenneth H. Betts
*Attorney, Agent, or Firm*—Teagno & Toddy

[57] ABSTRACT

An inflator is provided for inflating the expandable confinement of a vehicle occupant restraint system, to restrain an occupant in response to a collision signal. The inflator contains a source of inflation fluid, such as a propellant which is ignited upon the receipt of the collision signal. The inflator has fluid-directing means including passage means for the flow of the inflating fluid therethrough. A deformable diffuser is provided having a first position in sealing engagement with the outer surface of the inflator to seal the passage means, and a second position, subsequent to the ignition of the propellant, in which a portion of the diffuser is deformed out of sealing engagement with the inflator to permit passage of the inflating fluid. The fluid is directed by the diffuser radially away from the housing to inflate the confinement.

28 Claims, 7 Drawing Figures

INFLATOR FOR VEHICLE OCCUPANT RESTRAINT SYSTEM

BACKGROUND OF THE DISCLOSURE

The present invention relates to vehicle occupant restraint systems, and more particularly, to inflator systems for use with such restraint systems.

In general, vehicle occupant restraint systems utilize some type of a crash sensor which senses the rapid deceleration which occurs when the vehicle is involved in a collision. The collision signal from the sensor actuates an inflator system which provides a quantity of inflation gas to inflate the confinement which restrains the vehicle occupant. The restraint systems of the class described may be positioned in the dashboard for deployment in the passenger compartment of the vehicle, or may have the inflator and confinement portion of the system located on the steering wheel to deploy and restrain the driver. In the latter case, it is necessary that the inflator system fit compactly adjacent the steering wheel hub, without extending too far toward the driver, or radially toward the rim of the steering wheel. Therefore, while the present invention is equally adapted for any occupant restraint system, it is especially useful for such a system which is located on the steering wheel, and will be described in connection therewith.

The use of a restraint system in which the inflator is sufficiently compact for location on the steering wheel has introduced related problems. Because the driver is seated closer to the steering wheel than the passenger is to the dashboard, it is necessary that the steering wheel confinement be fully deployed in a shorter period of time. However, if too great an inflation force is exerted on the confinement in a direction toward the driver, the confinement may engage the driver and cause injury. On the other hand, if excessive inflation force is directed radially outward from the inflator, the result may be damage to the confinement, which would impair its ability to restrain the driver.

Accordingly, it is an object of the present invention to provide an improved inflator for a vehicle occupant restraint system which is suitable for mounting on the steering wheel.

It is another object of the present invention to provide such an inflator system which has a more compact profile, but which does not readily cause injury to the driver or damage to the confinement.

It is a more specific object of the present invention to provide an inflator system in which the inflation gas passes axially out of the inflator, and is then deflected or diffused radially outward from the inflator to the confinement.

It is another more specific object of the present invention to provide an inflator system which permits a gradual build-up in the pressure of the inflation gas before it is released to inflate the confinement.

The inflators used with occupant restraint systems may have, as their source of inflation gas, solid (pyrotechnic) propellants, stored gas, or a hybrid combination of the two. Because of the large amount of space required to store a container of pressurized gas (stored gas), the use of pyrotechnic inflators is favored for steering-wheel mounted systems. Therefore, although the present invention may be used with any of the three sources of inflation gas mentioned, it is especially advantageous when used with a pyrotechnic inflator system and will be described in connection therewith.

Typically, steering-wheel mounted inflators are cylindrical, with the outer wall being generally concentric with the steering-wheel rim. It will be appreciated that the inflator should provide a relatively uniform source of inflation gas to the confinement, if the gas is to be directed radially outward from the inflator. At the same time, the formation and release of the gas should occur as quickly as possible. However, in order to make the inflator compact as well as technologically and economically feasible, only one ignition squib is normally used. The problems in achieving relatively uniform ignition of propellant stored in an inflator having a circular cross-sectional area of 10 sq. in. or more can be readily appreciated.

Accordingly, it is also an object of the present invention to provide an inflator for an occupant restraint system in which the ignition of the propellant occurs generally uniformly throughout the cross-sectional area of inflator.

SUMMARY OF THE INVENTION

These and other objects of the present invention, which will become apparent upon a reading of the following detailed description, are accomplished by the provision of an improved inflator which comprises a source of inflating fluid and means operable upon receipt of a collision signal to activate the source of fluid and cause it to flow from the inflator. There is also a fluid directing means which includes means defining discharge port means for the flow of the inflating fluid. A diffuser means is disposed over the discharge port means, and the diffuser means includes a member having an initial position sealing the discharge port means. The member has portions deformably movable upon actuation of the fluid source to a position permitting the fluid flow from the discharge port means, and diffusing same.

In accordance with another aspect of the present invention, an inflator is provided for use with a vehicle occupant restraint system. The inflator comprises a housing defining a central axis, a propellant stored within the housing, and means for igniting the propellant to yield a pressurized inflation gas in response to a collision signal. The housing has portions defining passage means for the inflation gas. A deformable diffuser is provided having a first position in sealing engagement with the outer surface of the housing to seal the passage means, and a second position, subsequent to the ignition of the propellant, in which a portion of the diffuser is deformed out of sealing engagement with the housing to permit the inflation gas to pass through the passage means. The diffuser directs the gas radially away from the housing to inflate the confinement.

In accordance with a more limited aspect of the present invention, the propellant includes a primer charge disposed circumferentially within the housing for ignition by the igniting means to facilitate generally uniform ignition of the propellant. Preferably, the primer is disposed to form a generally continuous ignition path, and the igniting means may comprise an ignition squib and an ignition shield disposed about the squib, with the squib being disposed approximately tangentially with respect to the ignition path.

DESCRIPTION OF THE PREFERRED EMBODIMENTS

Figure 1:
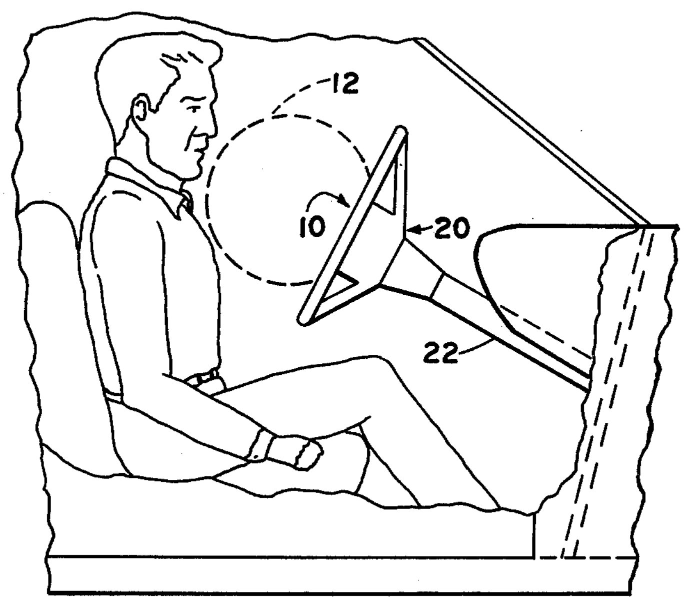
FIG. 1 is a semi-schematic side elevational view of the use of the present invention.

Referring now to the drawings which are for the purpose of illustrating preferred embodiments of the present invention, and not for limiting the same, FIG. 1 is a semi-schematic, fragmentary elevational view of a vehicle utilizing the invention. Although the teachings of the invention may be used to protect occupants of many types of vehicles, such as trucks, boats, and airplanes, the occupant restraint system described herein is illustrated protecting the driver of an automobile. The safety apparatus, generally designated 10 is positioned on the steering wheel, generally designated 20, with the confinement fully deployed as shown by the dotted line 12.

Figure 2:
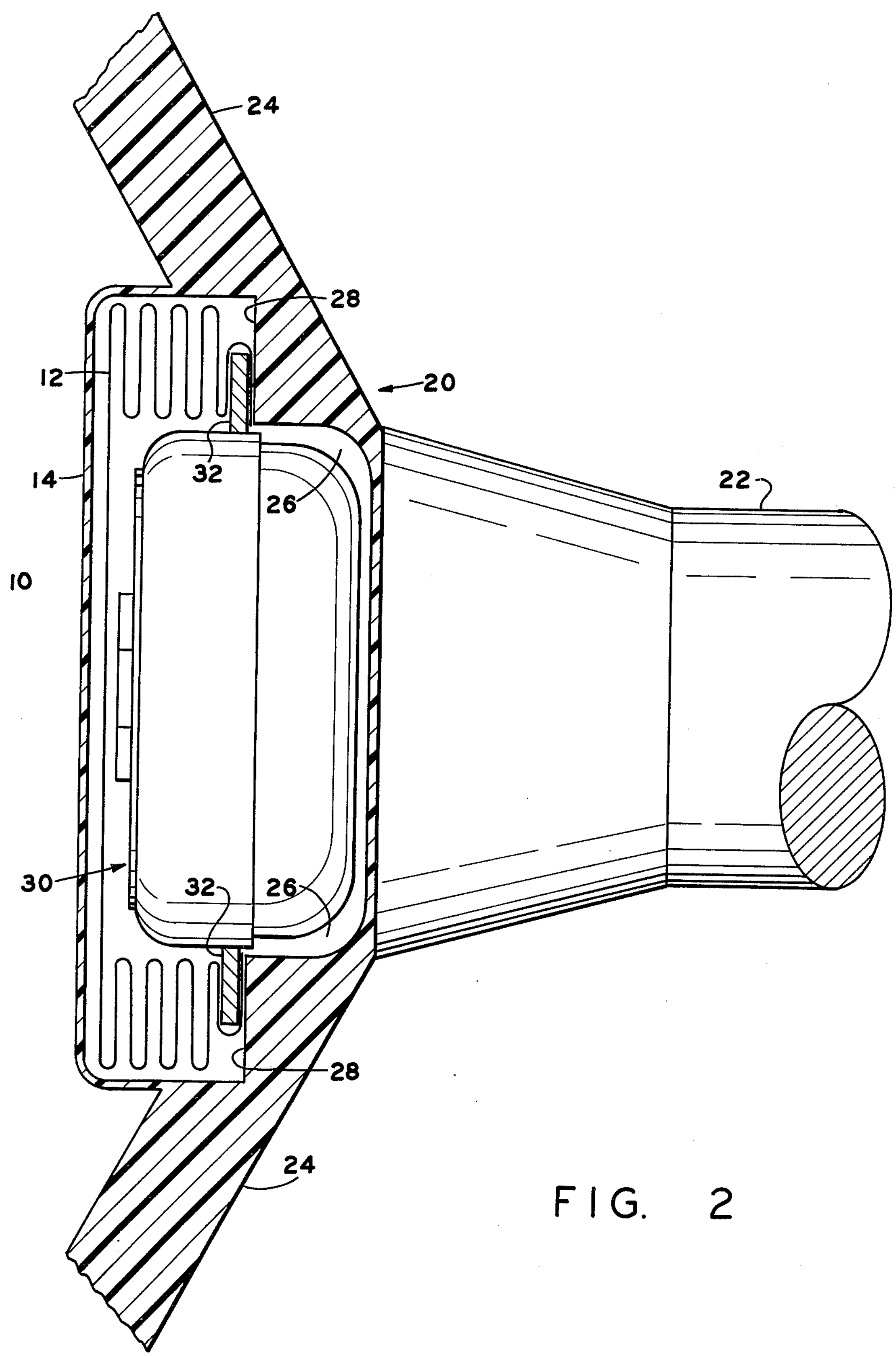
FIG. 2 is a fragmentary cross-sectional view taken through the steering wheel of FIG. 1.

As is shown in greater detail in FIG. 2, the safety apparatus 10 is positioned adjacent the hub of steering wheel 20 which includes a steering column 22 and oppositely disposed spokes 24 extending to and supporting the steering wheel rim (not shown). The central portion of the steering wheel 20 defines a chamber 26 and a shoulder surface 28. Within the chamber 26 is positioned the inflator, generally designated 30, and the outer flange 32 is seated on the shoulder surface 28 and attached thereto, trapping the peripheral edge of the confinement 12 between the flange 32 and surface 28. The confinement 12 is enclosed within a housing or enclosure 14, which is easily rupturable to permit the expansion of the confinement 12, by the use of perforations, or a weakened portion, or other suitable means. When a collision signal is sent to some type of electro-explosive means within the inflator 30, the propellant or other combustible mixture contained therein is ignited and the resulting inflation gas passes from the inflator, in a manner which will be described subsequently, inflating the confinement 12 and forcing open the enclosure 14.

Figure 3:
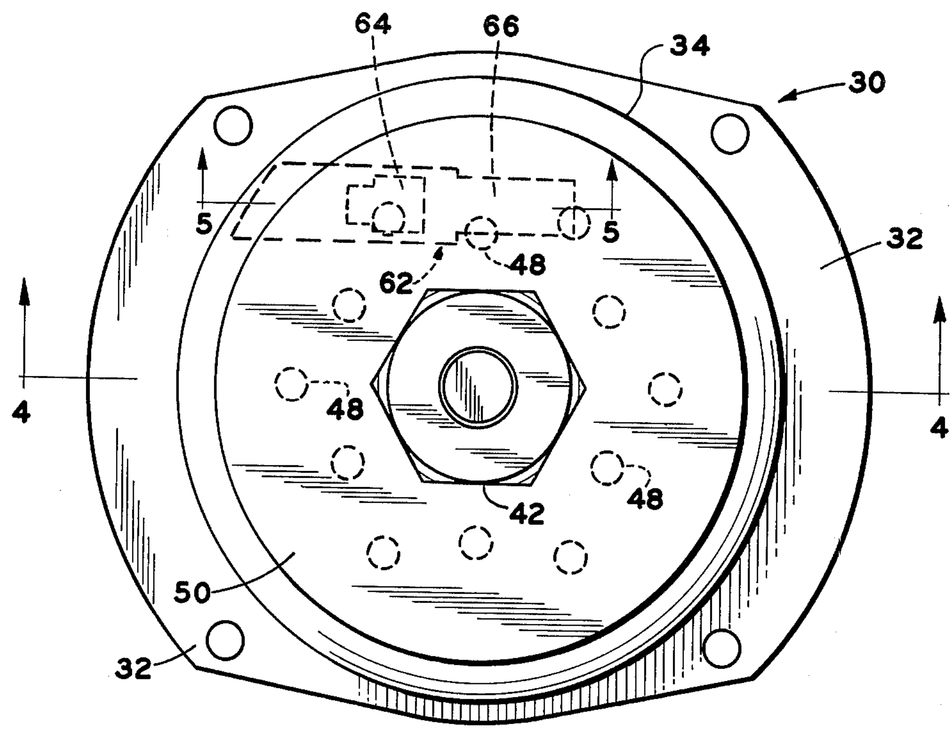
FIG. 3 is a plan view of the inflator of the present invention.
Figure 4:
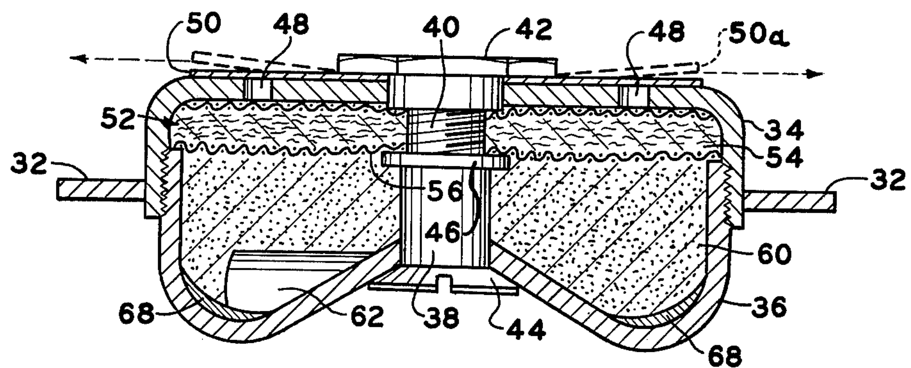
FIG. 4 is a cross-sectional view taken on line 4—4 of FIG. 3.

The plan view of the inflator 30 of FIG. 3 and the cross-sectional view of FIG. 4 illustrate the inflator in greater detail. The flange 32 is welded about the periphery of a cover member 34 which is threadably connected to base member 36. The cover member 34 and base member 36 are centrally supported and axially restrained by the member 38 having a threaded portion 40 at the cover end thereof, with a nut 42 threaded onto the portion 40 to restrain the central region of the cover member 34. The stud 38 has a head 44 engaging the outer surface of the conical portion of base member 36, and intermediate the cover end and the base end of the stud 38 is a shoulder 46, the function of which will be described subsequently. The cover member 34 defines a plurality of passages or apertures 48, which may be placed in any one of a number of patterns about the upper portion of cover member 34. Preferably the apertures 48 will be distributed generally uniformly throughout the cover member and will be of sufficient number and size to provide suitable passage means for the inflation gas to pass from the inflator. Because the pressure generated by the combustion of the propellant is normally in the range of about 3,500 psi, it is desirable that the cover member 34 and base member 36 be made from pressure vessel steel, and in the subject embodiment, the outside diameter of the cover member 34 is about 4.0 inches, while the wall thickness of the pressure vessel steel is about one-eighth inch or more.

Held firmly between the upper surface of cover member 34 and the nut 42 is a diffuser 50, shown in its normal position in which it is held face-to-face with the upper surface of the cover member 34, and seals the apertures 48. The diffuser 50 preferably comprises a circular metal disc which may have at least its outer portion bonded to cover member 34 by means of adhesive or epoxy to provide an air tight and water tight seal between the diffuser and cover member. Within the cover member 34 is a filter pack, generally designated 52, which includes a central region of filter material 54, which may be fiberglass, and a pair of restraining layers 56, such as stainless steel screen. The filter pack 52 is utilized adjacent the apertures 48 to be sure that no hot particles, resulting from the combustion, pass from the inflator, because such particles would damage the confinement material. The filter pack 52 may be partially restrained by the shoulder 46 of the member 38.

The remainder of the inflator 30 is the source of fluid which includes a propellant 60 and an ignition means 62. The propellant 60 may be any one of a number of combustible mixtures, such as one of the commercially available azide-base propellants. The ignition means 62 typically utilizes a squib 64 which fires in response to a collision signal received by the squib by means of a pair of electrical leads (not shown). The squib 64 is enclosed by a shield 66 which will be described in greater detail subsequently.

Because of the problems involved in achieving uniform combustion of the propellant, as described previously, it has been found useful to employ a primer charge 68 arranged to form an ignition path extending circumferentially around the bottom of base member 36. In the subject embodiment, the primer charge comprises a layer of granules of fast burning material bonded to the bottom surface of the base member, and preferably used in sufficient quantity to form a continuous ignition path.

Figure 5:
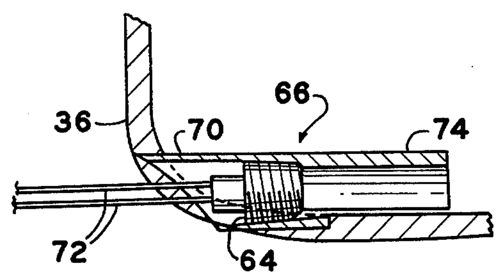
FIG. 5 is a cross-sectional view taken on line 5—5 of FIG. 3.

Referring now to FIG. 5, in conjunction with FIGS. 3 and 4, the shield 66 can be seen in greater detail. The left hand portion 70 of the shield 66 is attached, as by welding, to the inner surface of the base member 36, surrounding an orifice therein, through which the electric leads 72 are attached to the squib 64. The portion 70 includes internal threads for threaded engagement of the squib 64 therein. The right hand portion of the shield 66 comprises a shielding member 74 having a configuration such that when a collision signal is received and the squib 64 is fired, the ignition blast is directed downward to the primer charge 68, to which the squib 64 and shield 66 are disposed approximately tangentially for faster ignition of the primer charge 68.

Because the primer charge ignites much faster than the propellant 60, the primer charge is ignited around the entire circumference of the inflator and as a result, provides circumferentially uniform ignition of the propellant 60. As the propellant 60 burns, thus generating the gas needed to inflate the confinement, the gas pressure within the inflator and within the apertures 48 gradually builds up (i.e., over a space of several milliseconds), exerting force against the underside of the diffuser 50. When the pressure buildup is sufficient, the bond holding the diffuser 50 to the cover member 34, as well as the inherent rigidity of diffuser 50, is overcome and the diffuser is deformed into the upwardly opening concave configuration shown in dotted line form at 50*a*. Upon the deformation of the diffuser 50*a*, the inflation gas is free to escape through the apertures 48, but rather than continuing to move axially (upward in FIG. 4), it is forced by the diffuser 50*a* to move radially outward from the inflator as shown by the dotted arrows. It can be readily appreciated by referring again to FIG. 2, in conjunction with FIG. 4, that such deployment of the diffuser 50*a* and resulting radial flow of the inflation gas minimizes the chances of injurious impact of the confinement against the driver or damage to the confinement.

Figure 6:
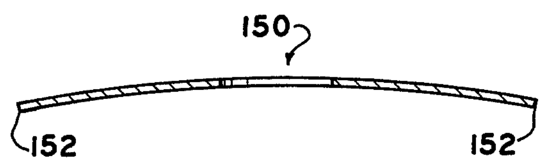
FIG. 6 is a cross-sectional view of an alternative embodiment of the diffuser used herein.

FIG. 6 illustrates an alternative embodiment of the diffuser, designated herein 150, in which the diffuser has a downwardly opening concave configuration, and biased in the manner of a Belleville washer, so that when it is assembled between the nut 42 and cover member 34, the force required to flatten the diffuser 150 is transmitted to the peripheral edge 152 to provide a greater sealing force between the edge 152 and top surface of cover member 34.

Figure 7:
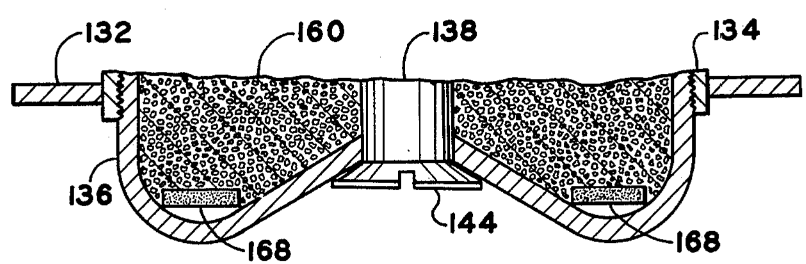
FIG. 7 is a fragmentary cross-sectional view, similar to FIG. 4, illustrating an alternative embodiment of the present invention.

The fragmentary cross-sectional view of FIG. 7, similar to that of FIG. 4, illustrates another alternative embodiment with like elements bearing like numbers, but preceded by a "1." The primer charge 68, rather than being a continuous layer of granules, comprises a plurality of ignition pellets 168. The pellets 168 may be placed in the base member 36, or an ignition means may be cast or pressed into the base member. Preferably, the pellets may be spaced closely enough to be in contact or may have a very small gap between adjacent pellets as long as the gap does not become large enough to interrupt the substantially continuous, circumferential ignition path.

The invention has been described in great detail sufficient to enable one of ordinary skill in the art to make and use the same. Obviously, modifications and alterations of the preferred embodiments will occur to others upon a reading and understanding of the specification and it is our intention to include all such modifications and alterations as part of our invention insofar as they come within the scope of the appended claims.

We claim:

1. An inflator for inflating an expandable confinement for restraining a vehicle occupant in response to a collision signal, said inflator comprising:

a. a source of inflating fluid;
b. means operable upon receipt of said collision signal to actuate said fluid source and cause inflating fluid to flow therefrom;
c. means for directing said fluid flow to said confinement, said fluid directing means including means defining discharge port means for flow of inflating fluid therefrom; and
d. diffuser means disposed over said discharge port means, said diffuser means including a thin, rigid member having an initial position sealing said discharge port means, said member having portions thereof deformably movable upon actuation of said fluid source to a position permitting and diffusing fluid flow from said discharge port means, wherein said movable portions of said rigid member are resiliently deformed by pressurized fluid flow to a position in which said movable portions of said member direct said fluid flow radially away from the inflator.

2. The inflator defined in claim 1, wherein:

a. said source of inflating fluid includes a combustible mixture; and
b. said means to actuate said fluid source includes electro-explosive means operable to ignite said combustible mixture.

3. The inflator defined in claim 1, wherein:

a. said port means includes means defining a plurality of apertures discharging flow in spaced generally parallel flow paths; and
b. said deformable member is disposed so as to diffuse said fluid flow at generally right angles to said parallel flow.

4. The inflator defined in claim 1 wherein said deformable member has the central portion thereof secured to said housing.

5. The inflator defined in claim 1 wherein said fluid source comprises a combustible propellant and a primer charge disposed within said inflator to form an ignition path circumferentially around said inflator.

6. The inflator defined in claim 5 wherein said primer charge ignition path has a substantially ring-shaped configuration and includes granules of said primer bonded to the bottom interior surface of said inflator.

7. The inflator defined in claim 6 wherein said actuating means comprises an ignition means including a squib and a shield disposed about said squib, and said squib is disposed approximately tangentially with respect to said ignition path.

8. The inflator defined in claim 7 wherein said ignition shield includes an ignition-directing portion disposed between said squib and said propellant to direct the flash generally downward toward said primer.

9. An inflator for use with a vehicle occupant restraint system, comprising:

a. a housing defining a central axis;
b. a propellant stored within said housing;
c. means for igniting said propellant to yield a pressurized inflation gas in response to a collision signal;
d. said housing having portions thereof defining passage means for said inflation gas; and
e. a deformable metal diffuser having a first position in sealing engagement with the outer surface of said housing to seal said passage means, and a second position, subsequent to the ignition of said propellant, in which a portion of said diffuser is resiliently deformed out of sealing engagement with said housing to permit said inflation gas to pass through said passage means, said diffuser directing said gas radially away from said housing to inflate the confinement.

10. The inflator of claim 9 wherein said pressurized inflation gas consists essentially of reaction products from the ignition of said propellant.

11. The inflator of claim 9 wherein said deformable diffuser is a relatively thin, normally flat member having an inner portion fixedly attached to said housing and an outer portion freely deformable away from said housing to expose said passage means.

12. The inflator of claim 11 wherein said deformable diffuser is a generally washer-shaped member.

13. The inflator of claim 9 wherein said housing is generally cylindrical, the axis of rotation of the cylinder being substantially coincidental with said central axis.

14. The inflator of claim 9 including a layer of filter material positioned intermediate said propellant and said passage means.

15. The inflator of claim 9 wherein said housing further comprises a cover member defining said passage means, and a base member oppositely disposed from said cover member, and adapted to be threadably connected.

16. The inflator of claim 15 wherein said base member and said cover member are maintained in sealing engagement by a stud member having a cover end and a base end, centrally disposed within said housing, and including on at least one end thereof, a threaded portion projecting from said housing and a mating restraining nut.

17. The inflator of claim 16 wherein said threaded portion and said nut are on the cover end of said stud member and said deformable diffuser is a thin, generally circular member having a central aperture through which said stud member projects, said diffuser being fixedly held between said cover member and said restraining nut.

18. The inflator of claim 9 wherein said deformable diffuser is disposed, in its deformed condition, to permit an approximately uniform flow of said inflation gas in all directions, to minimize the gas reaction force on said inflator.

19. The inflator of claim 18 wherein said passage means comprises a plurality of apertures generally uniformly spaced apart to provide circumferentially uniform fluid flow from said inflator.

20. The inflator of claim 9 wherein said deformable diffuser is a relatively thin, generally circular member having a normally concave configuration, opening downwardly, to provide a more effective seal when said member is maintained in substantially flat sealing engagement with the outer surface of said housing.

21. The inflator of claim 9 wherein said propellant includes a primer charge disposed circumferentially within said housing for ignition by said ignition means to facilitate generally uniform ignition of said propellant.

22. The inflator of claim 21 wherein said primer is disposed within said housing to form an ignition path circumferentially around said housing.

23. The inflator of claim 22 wherein said primer charge has a substantially ring-shaped configuration and includes granules of said primer bonded to the bottom interior surface of said housing.

24. The inflator of claim 22 wherein said primer comprises a plurality of pellets, closely spaced to form a generally circular ignition path within said housing.

25. The inflator of claim 22 wherein said ignition means comprises an ignition squib and an ignition shield disposed about said squib.

26. The inflator of claim 25 wherein said ignition path is generally circular, and said ignition squib is disposed approximately tangentially with respect to said ignition path.

27. The inflator of claim 26 wherein said ignition shield includes an ignition-directing portion disposed between said squib and said propellant to direct the ignition generally downward toward said primer.

28. Apparatus adapted to be attached to the steering wheel of a vehicle for restraining the driver of the vehicle upon the occurrence of a collision, comprising:

a. an inflator including a housing defining a central axis;
   a propellant stored within said housing;
   means for igniting said propellant to yield a pressurized inflation gas in response to a collision signal;
   said housing defining passage means for said inflation gas;
   a deformable metal diffuser having a first position in sealing engagement with the outer surface of said housing to seal said passage means, and a second position subsequent to the ignition of said propellant, in which a portion of said diffuser is resiliently deformed out of sealing engagement with said housing to permit said inflation gas to pass through said passage means;

b. rupturable enclosure means, partially surrounding, and cooperating with said inflator to define a storage compartment therebetween; and c. a confinement having a contracted, inoperative position disposed within said storage compartment and inoperative position, expanded to rupture said enclosure means by said inflation gas being directed radially away from said passage means by said diffuser.

* * * * *